(12) United States Patent
Zuilhof et al.

(10) Patent No.: US 8,221,879 B2
(45) Date of Patent: Jul. 17, 2012

(54) TAILOR-MADE FUNCTIONALIZED SILICON AND/OR GERMANIUM SURFACES

(75) Inventors: Johannes Teunis Zuilhof, Bennekom (NL); Catharina Gerarda Petronella Henrica Schröen, Wageningen (NL); Ahmed Arafat Mohamed Khamis, Giza (EG)

(73) Assignee: Wageningen University, Wageningen (NL)

( * ) Notice: Subject to any disclaimer, the term of this patent is extended or adjusted under 35 U.S.C. 154(b) by 914 days.

(21) Appl. No.: 11/571,040

(22) PCT Filed: Jun. 21, 2005

(86) PCT No.: PCT/NL2005/000449
§ 371 (c)(1),
(2), (4) Date: Oct. 14, 2008

(87) PCT Pub. No.: WO2005/123273
PCT Pub. Date: Dec. 29, 2005

(65) Prior Publication Data
US 2009/0098392 A1    Apr. 16, 2009

(30) Foreign Application Priority Data
Jun. 21, 2004 (EP) .................................. 04076809

(51) Int. Cl.
*B32B 9/04* (2006.01)
*B05D 1/18* (2006.01)
*C23F 1/14* (2006.01)

(52) U.S. Cl. .......... 428/333; 216/83; 427/309; 427/384; 428/451

(58) Field of Classification Search .................. 428/333, 428/451; 216/83; 427/309, 384
See application file for complete search history.

(56) References Cited

U.S. PATENT DOCUMENTS

| 6,358,613 | B1 | 3/2002 | Buriak et al. |
| 6,464,780 | B1 | 10/2002 | Mantl et al. |
| 6,485,986 | B1 * | 11/2002 | Buriak et al. ................. 436/527 |
| 6,569,979 | B1 | 5/2003 | Smith et al. |
| 6,780,796 | B2 | 8/2004 | Maa et al. |

OTHER PUBLICATIONS

Cattaruzza et al, "Carboxylic acid terminated monolayer formation on crystalline silicon and silicon nitride surfaces. A surface coverage determination with a fluorescent probe in solution", Journal of Materials Chemistry, vol. 14, No. 9, Mar. 29, 2004, pp. 1461-1468.*
Smet et al, "Covalently attached saccharides on silicon surfaces", J. Am. Chem. Soc., vol. 125, No. 46, Oct. 23, 2003, pp. 13916-13917.*
International Search Report for PCT/NL2005/000449, dated Sep. 14, 2005, 3 pages.

* cited by examiner

*Primary Examiner* — D. S. Nakarani
(74) *Attorney, Agent, or Firm* — Gilberto M. Villacorta; Sunit Talapatra; Foley & Lardner LLP

(57) ABSTRACT

The present invention relates to functionalized silicon and/or germanium surfaces, methods for the preparation of such tailor-made functionalized silicon and/or germanium surfaces, the use of such tailor-made functionalized silicon and/or germanium surfaces for the preparation of surface-bonded organic materials and the use in industrial devices. The silicon and/or germanium surfaces comprise silicon nitride, silicon carbide, germanium nitride, germanium carbide and silicon germanium surfaces.

19 Claims, 4 Drawing Sheets

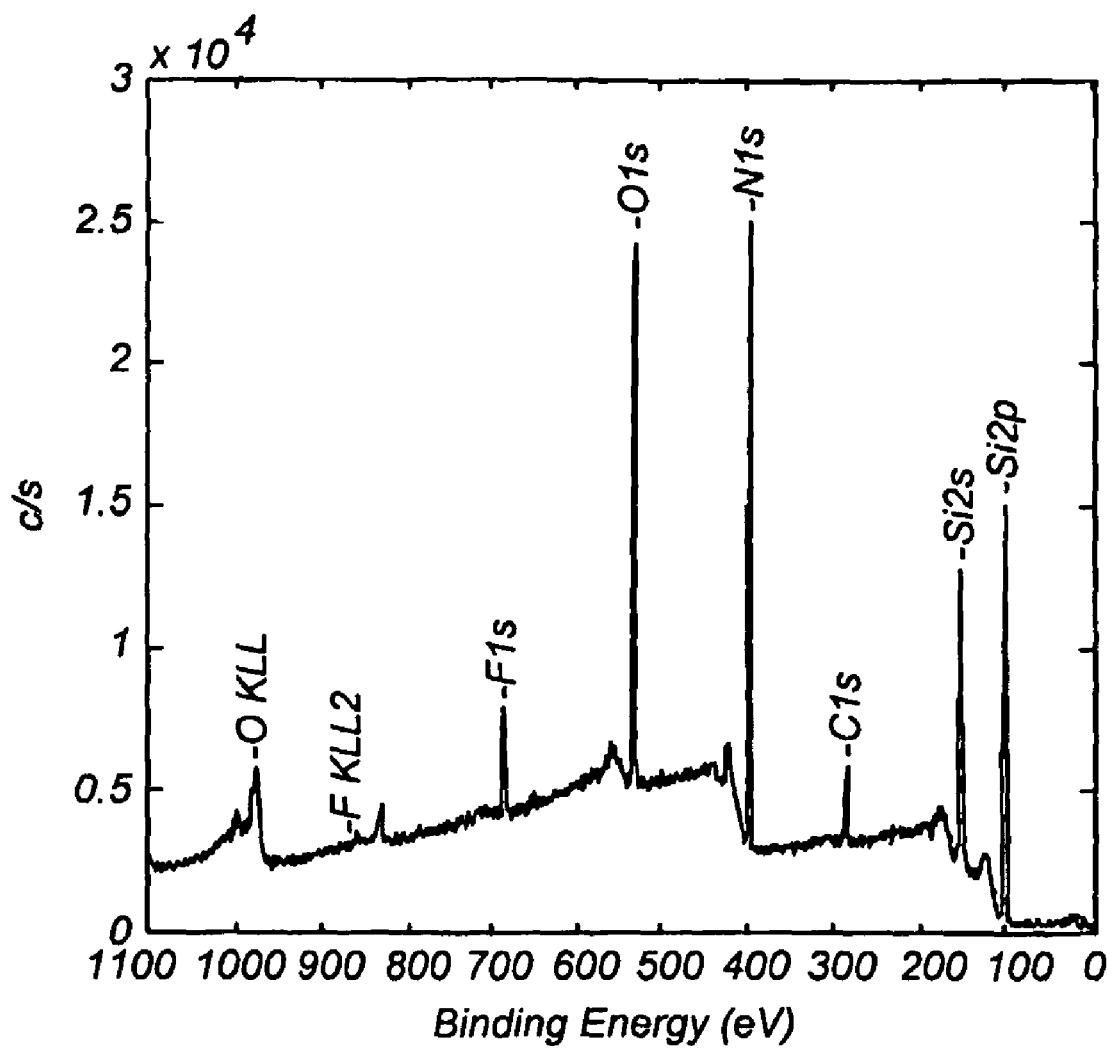

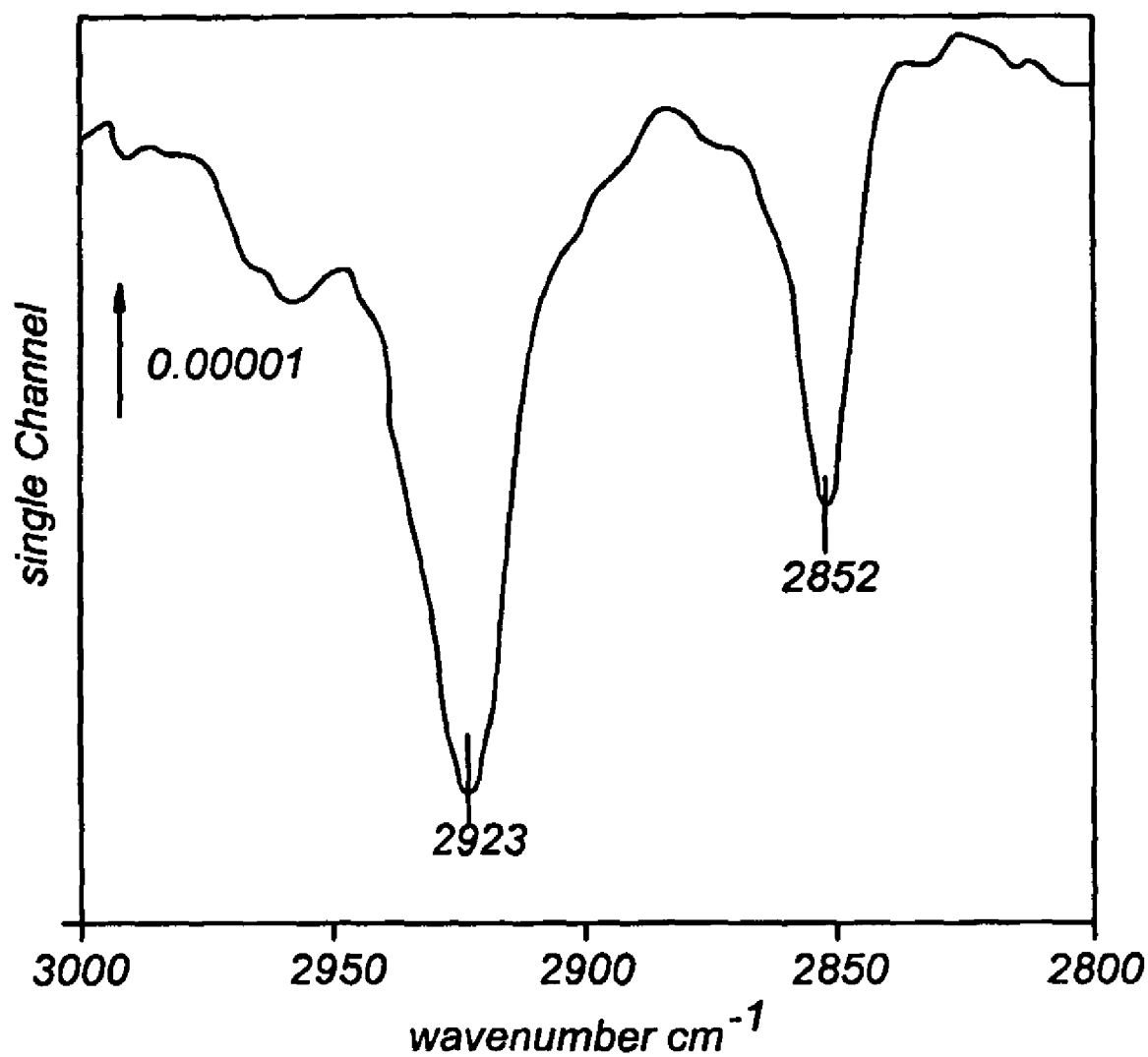

TAILOR-MADE FUNCTIONALIZED SILICON AND/OR GERMANIUM SURFACES

FIELD OF THE INVENTION

Figure 1:
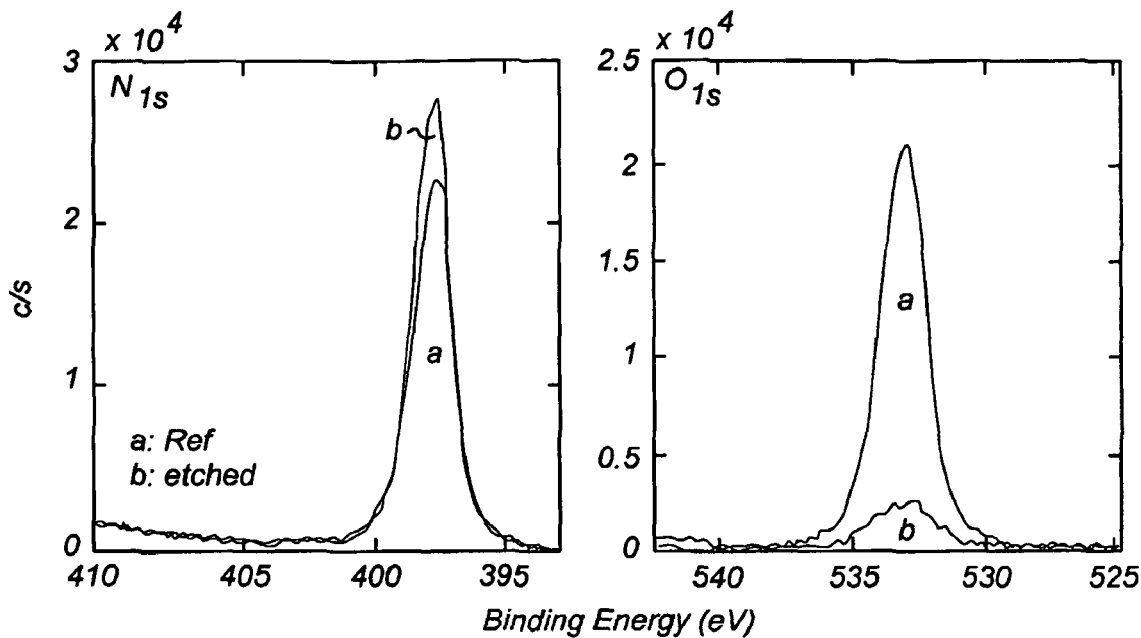

The present invention relates to tailor-made functionalized silicon and/or germanium surfaces, methods for the preparation of such tailor-made functionalized silicon and/or germanium surfaces, the use of such tailor-made functionalized silicon and/or germanium surfaces for the preparation of surface-bonded organic materials and the use in industrial devices such as micro-reactors, membrane filtration units, micro-sieves, AFM tips, microstructures and devices for analytical purposes.

BACKGROUND OF THE INVENTION

Silicon nitrides are well-known for outstanding properties such as its mechanical hardness, chemical inertness, and high electrical resistivity.[1] These properties are used in a wide variety of applications. In contrast, the surface properties of silicon nitrides are still poorly defined and usually also changing over time. This situation significantly hampers the large-scale use of silicon nitrides in a variety of applications. The way out is to provide a well-controlled and stable surface modification to silicon nitrides. However, this has been problematic up to now.[2]

However, surface modification of silicon oxides, and oxide-free silicon surfaces is well known in the art. Such functionalized oxide-free silicon surfaces having covalent organic mono-layers have been obtained by a variety of methods including thermal,[3,4] mild photochemical[5] or chemomechanical means.[6] For example, reaction of 1-alkenes or 1-alkynes with H-terminated Si surfaces allows for the construction of tailor-made surfaces, and have provided e.g. the covalent attachment of DNA fragments[7] and fragile carbohydrates.[8] The present invention, however, is not directed to functionalization of silicon or silicon oxide surfaces, but to silicon nitride, silicon carbide, germanium nitride, germanium carbide and silicon germanium surfaces.

U.S. Pat. No. 6,569,979, incorporated by reference herein, points in detail to the relevance of surfaces that are suitable for immobilization of biologically active materials such as RNA, DNA and fragments or derivatives thereof. U.S. Pat. No. 6,569,979 further discloses a method for modifying a non-oxidized silicon (001) surface, wherein functionalized 1-alkenes are reacted with hydrogen-terminated silicon under UV initiation. However, the method provides modified surfaces having a poor hydrophobicity as appears from the relatively low water contact angles. Modification by using tert. butoxycarbonyl protected 10-amino-1-decene afforded a modified non-oxidized silicon (001) surface having a water contact angle θ of only 78.1° C., i.e. near-identical to the value of non-modified hydrogen-terminated Si(001).

In contrast, modification of the silicon nitride surface has up to now largely been limited to the functionalization of the native $SiO_2$ that is present as a poorly defined, thin layer on silicon nitride surfaces. For example, this procedure is used in the modification of silicon nitride AFM tips to obtain specific substrate interactions.[9,10] Other examples of modified silicon nitrides include a poorly defined monolayer of 1-octadecene (static water contact angle θ=83°),[11] and a carboxylic acid-functionalized monolayer via the N-alkylation of an ω-bromoalkanoic acid.[12]

Cattaruzza et al., J. Mater. Chem. 14, 1461-1468, 2004, disclose that silicon nitride surfaces can be etched with HF to provide terminal —$NH_2$ and —NH groups which can be converted in a subsequent step with ω-functionalized alkyl bromides. In the end product, the ω-functionalized alkyl groups are bonded to the silicon nitride surfaces via the reduced nitrogen atoms of the silicon nitride. The alkyl groups contain carboxyl, ester or amide functionalities (cf. entries 1, 2 and 13 of Table 1).

In this patent application, the silicon and/or germanium surfaces are generally defined as silicon nitride, silicon carbide, germanium nitride, germanium carbide and silicon germanium surfaces. Although these expressions are apparent to the person skilled in the art, a more specific definition of the silicon and/or germanium surfaces are surfaces comprising silicon and germanium nitrides according to the general formula $M_3N_x$, wherein M is either Si or Ge and x is in the range of about 1 to about 4, silicon and germanium carbides according to the general formula $M_xC_y$, wherein M is either Si or Ge, x is in the range of about 0.3y to about 3y, as well as "strained silicon" which is known in the art as $Si_{1-x}Ge_x$ wherein x is in the range of about 0 to about 1, preferably about 0.05 to about 0.95. It is well known in the art that the stoichiometry of these surfaces can continuously be varied, depending on the properties desired.

For brevity, in this application the abbreviation "Si/Ge-surfaces" is used to indicate silicon and/or germanium surfaces as defined herein.

"Strained silicon" contains germanium atoms in the crystal lattice with the result that the atoms are spread further apart than in neat silicon. In strained silicon, electrons experience less resistance and flow up to 70 percent faster compared to neat silicon which can lead to much faster chips. Strained silicon and methods of preparing strained silicon is for example disclosed in U.S. Pat. No. 6,464,780 and US 2004/0087119, both incorporated by reference herein.

SUMMARY OF THE INVENTION

The present invention therefore relates to a functionalized Si/Ge surface, wherein alkyl or alkenyl moieties are covalently bonded to the Si/Ge surface, the alkyl and alkenyl moieties being represented by the general formula (1):

wherein A is a linear, branched or cyclic alkylene or alkenylene group having 2 to 24 carbon atoms, the alkenylene group being a 1-alkenylene or an internal alkenylene group; B is a functional group selected from:
—CH=$CR^2R^3$; —C=$CR^2$; —$XR^2$; —$N(R^2)_2$; —$NR^2$—C(O)—$N(R^2)_2$; —O—$[(C(R^4)_2)_pO]_q$—$R^2$; —$C(X)XR^1$; —$C(X)NR^2R^3$; —$S(O)OR^1$; —$S(O)_2OR^1$; —$S(O)NR^2R^3$; —$S(O)_2NR^2R^3$; —$P(O)(R^1)(OR^1)$; —$P(O)(OR^1)_2$; —CN; —Cl, —Br; —I; —NCX; —XCN; a group of the general formula (2) and tautomers thereof:

or a group of the general formula (3) and tautomers thereof:

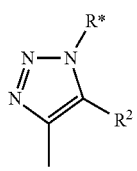

(3)

wherein $R^1$ is a linear, branched or cyclic alkyl group having 1 to 12 carbon atoms; a phenyl group; an alkaryl group having 7 to 12 carbon atoms; or an arylalkyl group having 7 to 12 carbon atoms; wherein the alkyl, phenyl, alkaryl and arylalkyl groups may be substituted with one or more of F or Cl;
$R^2$ and $R^3$ are independently hydrogen or a group as defined for $R^1$;
$R^4$ is independently selected from hydrogen or $C_1$-$C_4$ alkyl;
$R^5$ is independently selected from hydrogen, —OH and —$NH_2$;
$R^*$ is a group as defined for $R^1$ or selected from the group consisting of DNA, ethylene oxide propylene oxide polymers, sugars, peptides and fragments thereof;
p is an integer in the range of 2-4;
q is an integer in the range of 1 to 500;
X is independently O or S; and
n is an integer in the range of 1 to 3.

DETAILED DESCRIPTION OF THE INVENTION

According to the invention, A is a linear, branched or cyclic alkylene or alkenylene group having 2 to 24 carbon atoms, wherein the alkenylene group is a 1-alkenylene or an internal alkenylene group. Examples of suitable alkylene groups are ethylene, propylene, butylene, pentylene, decylene, octadecylene and eicosenylene and the like. Examples of suitable alkenylene groups are propenylene, but-2-enylene, oct-4-enylene and the like.

According to a most particular preferred embodiment of the present invention, the alkyl and alkenyl moieties comprise at least one internal ethynylene moiety. That is, that A is in particular a linear group having 6 to 24 carbon atoms according to the formula:

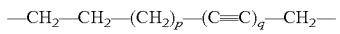

wherein p is in the range of 1 to 7 and q is in the range of 1 to 7, the groups —($CH_2$)— and —(C≡C)— optionally occurring in a random sequence, and wherein the right terminus of A is bonded to B. Such ethynylene moieties can be polymerized to provide a cross-linked network that will reduce the permeability of the monolayer, and that will provide more stabilization to the monolayer. Examples of this linear group are:

and

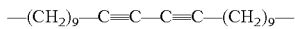

Preferably, the linear group has the formula —$CH_2$—$CH_2$—($CH_2$)$_p$—(C≡C)$_q$—($CH_2$)$_r$—, wherein p is 1 to 9, preferably 7, r is 1 to 9 and q is 1 or 2.

According to the invention, B can be selected from the functional groups as defined above. Suitable examples of —CH=$CR^2R^3$ groups are ethenyl, 2-propenyl, 4-butenyl and the like. The formula —CH=$CR^2R^3$ may represent a cyclic structure having a carbon carbon double bond in the ring or having an exo carbon carbon double bond, that is that the formula —CH=$CR^2R^3$ includes structures such as cyclopent-3-enyl and 2-methylene cyclopentyl.

Suitable examples of —C≡$CR^2$ groups are ethynyl, 2-propynyl and the like.

Suitable examples of the —$XR^2$ group are —OH, —SH, —OMe, —OEt and the like, wherein Me represents methyl and Et represents ethyl.

Suitable examples of the —$N(R^2)_2$ group include primary, secondary and tertiary amino groups such as —$NH_2$, —NHEt and —$NMe_2$.

A suitable example of the urea group —$NR^2$—C(O)—N$(R^2)_2$ is —NH—C(O)—$NH_2$.

The group —O—[$(C(R^4)_2)_pO]_q$—$R^2$ represents oligomers and polymers of alkylene oxides. $R^4$ is selected from the group consisting of hydrogen and $C_1$-$C_4$ alkyl, e.g. methyl, ethyl, n-propyl and i-propyl. Preferably, $R^4$ is hydrogen or methyl and p is 2. The group —O—[$(C(R^4)_2)_pO]_q$—$R^2$ encompasses diblock, triblock, multiblock or comb-like oligomers and polymers, e.g. —O—[($CH_2O)_s$—$(CHMeO)_t$]—$R^2$ wherein s+t=q. A suitable diblock polymer consists for example of a polyethylene oxide block and a polypropylene oxide block. In addition, these oligomers and polymers may be terminated with a hydroxyl group or an alkoxy group (e.g. a methoxy group), the latter being represented by —$OR^2$ as appears from the formula.

Suitable examples of the —$C(X)XR^1$ group are ester groups and thioester groups, e.g. —C(O)OMe, —C(O)OEt, —C(S)SMe and the like.

Suitable examples of the amide groups or thioamide groups —C(X)$NR^2R^3$ are —C(O)$NMe_2$ and —C(S)$NMe_2$.

Suitable examples of the sulfino group —S(O)$OR^1$ are —S(O)OMe and —S(O)OEt.

Suitable examples of the sulfonyl group —$S(O)_2OR^1$ are —$S(O)_2$OMe and —$S(O)_2$OEt.

Likewise, a suitable example of the group —S(O)$NR^2R^3$ includes —S(O)$NMe_2$.

A suitable example of the sulfamoyl group —$S(O)_2NR^2R^3$ is —$S(O)_2NMe_2$.

A suitable example of the group —P(O)($R^1$)($OR^1$) is —P(O)(Me)(OMe) and a suitable example of the group —P(O)$(OR^1)_2$ is —P(O)$(OMe)_2$.

A suitable example of the —NCX group is the isocyanate group.

Suitable examples of the groups according to formula (2) are shown below as belonging to preferred embodiments of B.

According to a preferred embodiment of the present invention, B is a functional group selected from —CH=$CR^2R^3$; —C≡$CR^2$; —$OR^2$; —$N(R^2)_2$; —$NR^2$—C(O)—$N(R^2)_2$; —O—[$(C(R^4)_2)_pO]_q$—$R^2$; —C(O)$OR^1$; —C(O)$SR^1$; —C(O)$NR^2R^3$; —S(O)$OR^1$; —$S(O)_2OR^1$; —S(O)$NR^2R^3$; —$S(O)_2NR^2R^3$; —P(O)($R^1$)($OR^1$); —P(O)$(OR^1)_2$; —CN; —Cl; —NCO; —OCN; and

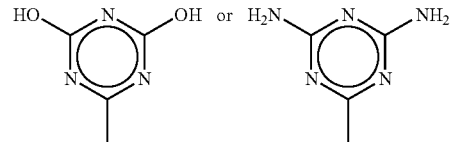

and tautomers thereof,
and wherein n is 1.

According to a more preferred embodiment of the present invention, B is a functional group selected from —CH═CR²R³; —C≡CR²; —OR²; —N(R²)₂; —O—[(C(R⁴)₂)ₚO]_q—R² wherein R⁴ is hydrogen or methyl, p is 2 and q is an integer within the range of 1-250; —C(O)OR¹; —C(O)NR²R³; —S(O)OR¹; —S(O)₂OR¹; —S(O)NR²R³; or —S(O)₂NR²R³; and wherein n is 1.

It is furthermore preferred that A is a linear alkylene or alkenylene group having 2 to 24 carbon atoms. More preferably, A is a linear alkylene or alkenylene group having 6 to 20 carbon atoms. Even more preferably, A is a linear alkylene or alkenylene group having 8 to 18 carbon atoms.

The present invention also provides a process for the preparation of a functionalized Si/Ge surface, wherein a Si/Ge surface is subjected to the following steps:
(a) etching the Si/Ge surface with an etching agent to form an etched Si/Ge surface; and
(b) reacting the etched Si/Ge surface with an ω-functionalized alkene represented by the general formula (4) or with an ω-functionalized alkyne represented by the general formula (5) or with a mixture thereof:

(4)

(5)

wherein P is a linear, branched or cyclic alkenyl group having 2 to 24 carbon atoms, the alkenyl group being a 1-alkenyl group or an internal alkenyl group;

Q is a linear, branched or cyclic alkynyl group having 2 to 24 carbon atoms, the alkynyl group being a 1-alkynyl group or an internal alkynyl group;

C is a functional group selected from: —CH═CR²R³; —C≡CR²; —NR²—C(O)—N(R²)₂; —O—[(C(R⁴)₂)ₚO]_q—R¹; —C(X)XR¹; —C(X)NR²R³; —S(O)OR¹; —S(O)₂OR¹; —S(O)NR²R³; —S(O)₂NR²R³; —P(O)(R¹)(OR¹); —P(O)(OR¹)₂; —CN; —Cl, —Br; —I; or —NCX; —XCN; or C is a protected functional group selected from:
—XC(X)R¹; —NR²C(X)R¹; —XR⁵; —XSi(R¹)₃; —OS(O)(OR¹); —OS(O)₂OR¹; —P(O)(R¹)(OR¹); —OP(O)(OR¹)₂; a group of the general formula (6) and tautomers thereof:

(6)

wherein R¹, R², R³, R⁴, p and q are as defined above; R⁵ is a monofunctional hydroxy or thiohydroxy protecting group; R⁶ represents a protected —OH or —NH₂ group, wherein the protected —OH group is selected from the groups defined for —XR⁵ wherein X is O and wherein the protected —NH₂ group is selected from the groups defined for —NR²C(X)R¹; and wherein n is an integer in the range of 1 to 3.

According to the present invention, R⁵ is a monofunctional hydroxy or thiohydroxy protecting group. Such protecting groups are well known in the art as well as methods for adding such groups to —XH groups and methods for removing such protecting groups under conditions that do not affect the molecular structure of the functionalized Si/Ge surface obtained.¹⁵ Suitable examples of monofunctional hydroxy and thiohydroxy protecting groups include methoxymethyl, methylthiomethyl, 2-methoxyethoxymethyl, bis(2-chloroethoxy)methyl, tetrahydropyranyl, tetrahydrothiopyranyl, 4-methoxytetrahydropyranyl, 4-methoxytetrahydrothiopyranyl, tetrahydrofuranyl, tetrahydrothiofuranyl, 1-ethoxyethyl, 1-methoxyl-methoxyethyl, 2-(phenylselenyl)ethyl, t-butyl, allyl, benzyl, optionally substituted triphenylmethyl (trityl). However, it is preferred that the monofunctional hydroxyl or thiohydroxy protecting group is selected from the group of allyl, benzyl, optionally substituted trityl, and tetrahydropyranyl. It is even more preferred that the monofunctional hydroxyl or thiohydroxy protecting group is selected from benzyl and tetrahydropyranyl.

Suitable examples of the —Si(R¹)₃ group are trimethylsilyl, triethylsilyl, triisopropylsilyl, isopropyldimethylsilyl, t-butyldimethylsilyl, t-butyldiphenylsilyl and tribenzylsilyl. Methods of the introduction and removal of such groups are well known in the art.¹⁶

Preferably, C is a functional group selected from —CH═CR²R³; —C≡CR²; —NR²—C(O)—N(R²)₂; —O—[(C(R₄)₂)ₚO]_q—R¹; —C(O)OR¹; —C(O)NR²R³; —S(O)OR¹; —S(O)₂OR¹; —S(O)NR²R³; —S(O)₂NR²R³; —P(O)(R¹)(OR¹); —P(O)(OR¹)₂; —CN; —Cl; and —NCO; —OCN; or C is a protected functional group selected from —OC(O)R¹; —NR²C(O)R¹; —OR⁵; —OSi(R¹)₃; —OS(O)(OR¹); —OS(O)₂OR¹; —P(O)(R¹)(OR¹); —OP(O)(OR¹)₂; and a group of the general formula (6) and tautomers thereof which is shown above, wherein R⁶ represents a protected —OH or —NH₂ group, wherein the protected —OH group is selected from the groups defined for —XR⁵ wherein X is O and wherein the protected —NH₂ group is selected from the groups defined for —NR²C(X)R¹; wherein R⁵ is a monofunctional hydroxy or thiohydroxy protecting group; and wherein n is 1.

Even more preferably, C is a functional group selected from —CH═CR²R³; —C≡CR²; —O—[(C(R⁴)₂)ₚO]_q—R¹ wherein R⁴ is hydrogen or methyl, p is 2 and q is an integer within the range of 1-10; —C(O)OR¹; —C(O)NR²R³; —S(O)OR¹; —S(O)₂OR¹; —S(O)NR²R³; —S(O)₂NR²R³; or C is a protected functional group selected from —OC(O)R¹; —NR²C(O)R¹; —OR⁵; —OSi(R¹)₃; and a group of the general formula (6) and tautomers thereof which is shown above, wherein R⁶ represents a protected —OH or —NH₂ group, wherein the protected —OH group is selected from the groups defined for —XR⁵ wherein X is O and wherein the protected —NH₂ group is selected from the groups defined for —NR²C(X)R¹; wherein R⁵ is a monofunctional hydroxy or thiohydroxy protecting group; and wherein n is 1.

According to the present invention, it is preferred that C is in the ω-position of the alkenyl and alkynyl groups. Consequently, it is therefore preferred that the functionalized alkene is a ω-C-1-alkene and that the functionalized alkyne is a ω-C-1-alkyne, the ω-position being dependent on the number of carbon atoms of the alkene or alkyne, respectively.

According to a most particular preferred embodiment of the present invention, the alkenyl groups P and the alkynyl groups Q comprise at least one internal ethynylene moiety. That is, that P and Q are in particular a linear group having 6 to 24 carbon atoms according to the formula:

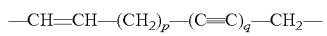

and

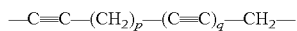

wherein p is in the range of 1 to 7 and q is in the range of 1 to 7, the groups —(CH₂)— and —(C≡C)— optionally occurring in a random sequence, and wherein the right terminus of P and Q are bonded to C. Preferably, the linear groups P and Q have the formula

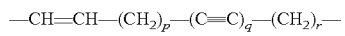

and

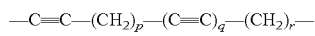

wherein p is 1 to 9, preferably 7, r is 1 to 9 and q is 1 or 2.

The etching agent is preferably selected from HF, $NH_4F$/HF or $H_3PO_4$. When $NH_4$/HF is used, the ratio of $NH_4F$ to HF is preferably 1:1 to 20:1, most preferably 5:1 to 15:1. Most preferably, however, the etching agent is HF.

According to the invention, the etching step is performed for at least about 0.01 h. to about 100 h.

The etching agent is usually used as a solution in water, said solution comprising about 0.1 to about 10.0 wt. %, preferably about 1.0 to 3.0 wt. % of the etching agent, based on the total weight of the solution. The etching step can be performed as is well known in the art.

In step (b) mixtures of ω-functionalized alkenes or mixtures of O-functionalized alkynes may be used. Step (b) may furthermore be performed in an inert organic solvent and elevated temperature, e.g. at reflux, or using microwave irradiation. The inert organic solvent is preferably a hydrocarbon such as mesitylene. However, according to the invention step (b) may be performed without solvent, i.e. that the etched Si/Ge surface is reacted with neat functionalized alkene according to the general formula (4) or neat functionalized alkyne according to the general formula (5).

An important advantage of the functionalized Si/Ge surfaces is their versatility, i.e. that they can provided with hydrophobic or hydrophilic properties depending on the nature of the functional groups B, which in addition can be converted into other groups as will be apparent to those skilled in the art. For example, the functional groups B may me made ionic, e.g. by converting amino groups into cationic ammonium groups or by converting carboxyl groups into anionic carboxylate groups.

The present invention further relates to the use of the functionalized Si/Ge surfaces in the preparation of Si/Ge surfaces bearing pendant groups, wherein the pendant groups are derived from biologically active groups or host molecules. As discussed in U.S. Pat. No. 6,569,979, incorporated by reference herein, the biologically active groups may be proteins, DNA or RNA molecules or fragments or derivatives thereof, e.g. single stranded oligonucleotides that have for example been used in gene sequencing, drug research, medical diagnostics and binding studies of ligands to oligonucleotides. Additionally, the host molecules may be selected from calixarenes, dendrimers or fragments and derivatives thereof and mono-oligo- and polysaccharides.

The present invention also relates to Si/Ge surfaces bearing pendant groups, wherein alkyl or alkenyl moieties as defined above are covalently bonded to the Si/Ge surface, wherein the alkyl or alkenyl moieties bear a pendant group, preferably in their ω-position, that are derived from biologically active groups or host molecules.

As will be apparent to those skilled in the art, such Si/Ge surfaces bearing pendant groups can be prepared from the functionalized Si/Ge surfaces as disclosed herein, wherein the functional groups B provide a linking means for bonding the biologically active groups or host molecules. For example, B may be an —OH group that by way of an esterification can be bonded to a host molecule bearing a carboxylic group. Obviously, if B is a protected functional group such as a —$OSiMe_3$ group, B must first be deprotected prior to the addition of the host molecule bearing a carboxylic group. It will be apparent to the person skilled in synthetic organic chemistry how to conduct the syntheses of such Si/Ge surfaces bearing pendant groups. The present invention therefore also relates to a process for the preparation of Si/Ge surfaces bearing pendant groups, wherein a functionalized Si/Ge surface is attached to a pendant group, wherein the pendant groups are derived from biologically active groups or host molecules.

Results and Discussion

Low-stress silicon-enriched silicon nitride surfaces (1 $cm^2$, 200 nm thickness) were deposited on polished silicon wafers using low-pressure chemical vapor deposition. The higher than stoichiometric Si/N ratio may direct the chemistry of silicon nitrides towards the chemistry of silicon, e.g. H-termination by treatment with HF solutions and monolayer attachment. XPS measurements show the presence of Si, C, N and O in solvent-cleaned but un-etched silicon nitrides (see Examples); the presence of C in the unmodified sample is attributed to environmental contamination.

Prolonged exposure to HF leaves the nitride layer largely intact: almost complete removal of oxygen is observed, while there are no significant changes in the N signal (XPS data; see FIG. 1: N1s and O1s XPS spectra of $Si_3N_x$ before (a) and after (b) etching in 2.5% HF for 2 min.). In addition, X-ray reflectivity measurements indicate no observable change in the silicon nitride layer thickness upon etching.

The static water contact angle θ was found to increase from ~20° to ~60° after 2 min etching with 2.5% HF solution, indicating the formation of the less polar Si—H bonds. The presence of N (partially as NH and $NH_2$ sites at the surface) makes θ for the H-terminated silicon nitride surface lower than that obtained for H-terminated Si surfaces.[8] The residual amount of oxygen that is observed after etching is at least partially due to deeply embedded atoms that cannot be removed upon etching, but which are therefore not expected to be reactive at the surface (a small fraction of surface re-oxidation can probably also not be fully excluded at this stage).[3]

Figure 2:
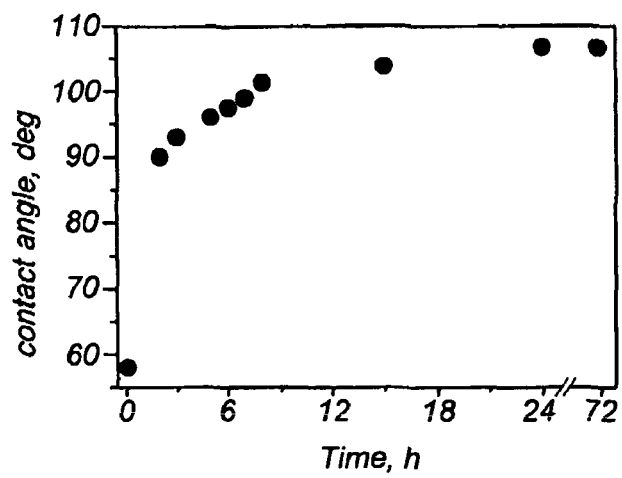

The effect of the reaction time on the quality of 1-hexadecene monolayers on silicon nitride surfaces, as studied by measuring θ, is shown in FIG. 2 (Variation of the static water contact angle θ of a 1-hexadecene-derived monolayer on silicon nitride as a function of reaction time). Stable and almost densely packed monolayers are obtained after ~24 h reaction time (θ~107°). This is much better than obtained without HF etching (θ~83°),[11] which is attributed to the formation of reactive Si—H bonds at the surface upon HF etching.

Figure 3:
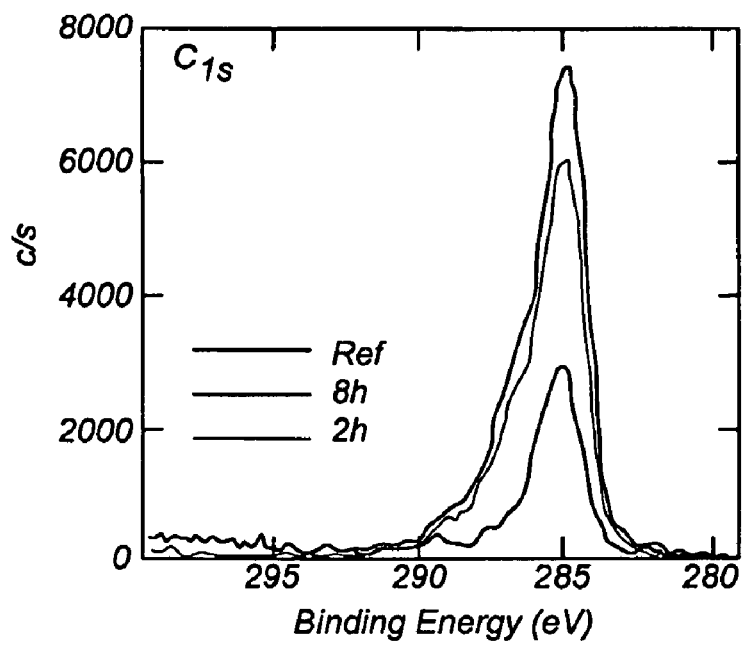

Support for monolayer formation also comes from XPS C1s spectra that show a clear increase in the amount of carbon upon modification after different time intervals (FIG. 3: XPS C1s spectra of $Si_3N$, before (reference spectrum), and after monolayer attachment of 1-hexadecene, for 2 and 8 h, respectively). The C1s signals due to the alkyl chain are not resolved from Si—C bond formation (284.9 and 283.1 eV, respectively).[14] The shoulder at 286.9 eV that appears only for modified $Si_3N_x$ is likely due to N—C bond formation.[14] No precise indication of the ratio of N—C and Si—C bond formation can be given at this stage, but without wishing to be bound by any theory, the inventors believe that both these data strongly support covalent monolayer attachment.

Figure 4:
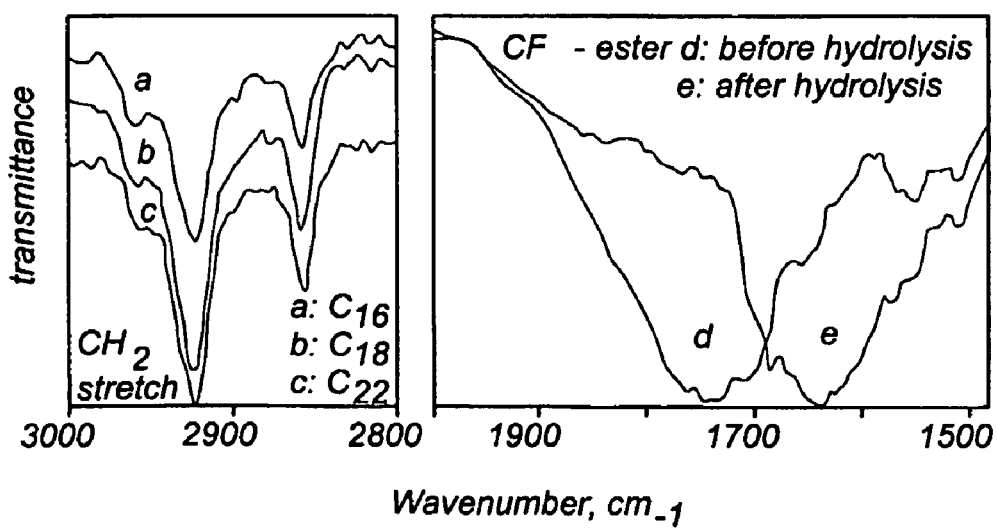

Increase of the 1-alkene concentration to neat reaction mixtures yields a rise of θ by 1-2° to ~106-108° (Example 3), which points to the formation of an almost densely packed hydrophobic monolayer. This packing is no indication for high ordering in this case, as shown by infrared reflection absorption spectroscopy (IRRAS, 1 cm$^{-1}$ resolution). IRRAS yields peaks corresponding to anti-symmetric and symmetric $CH_2$ vibrations at 2923 and 2855 cm$^{-1}$, respectively (see FIG. 4). These IRRAS spectra strongly support the presence of a well-defined monolayer. In addition, they also point to a significant degree of disorder in these monolayers, as the peak at 2923 cm$^{-1}$ is intermediate between that obtained for $CH_2$ in isotropic media (2928 cm$^{-1}$) and that obtained in crystalline media (2919 cm$^{-1}$).[1] The inventors attribute this disorder partially to the surface roughness of HF-etched silicon nitride surfaces, and likely also to a slightly diminished packing density of the monolayer.

Finally, functionalization of these monolayers has been shown via the attachment of a trifluoroethanol-ester derived alkene ($CH_2$=CH—($CH_2$)$_9$COOCH$_2$CF$_3$; Example 4 and FIG. 4: IRRAS data of modified silicon nitride (left) $CH_2$ vibrations after reaction of silicon nitride with different 1-alkenes. (right) C=O vibrations after reaction of silicon nitride with $CH_2$=CH($CH_2$)$_9$CO$_2$CH$_2$CF$_3$, before (d) and after (e) hydrolysis). Attachment shows in IRRAS the appearance of a C=O stretching vibration at 1740 cm$^{-1}$, characteristic for the ester functionality. Hydrolysis of this moiety under basic conditions (0.25 M potassium tert-butoxide in DMSO) reduced θ from 88° to 44°. This was also visible in the IRRAS spectrum, which yields a shift of the C=O stretch frequency from 1740 to 1640 cm$^{-1}$. Hydrolysis of this moiety under acidic conditions (2 N HCl) reduced θ from 88° to 32°. This was also visible in the IRRAS spectrum, which yields a shift of the C=O stretch frequency from 1740 to 1640 cm$^{-1}$. Stability of the alkyl monolayer under these circumstances was shown by a near-constant intensity of the $CH_2$ stretching vibrations.

EXAMPLES

Example 1

Modification of Silicon Nitride Surfaces

Organic monolayers on this H-terminated $Si_3N_x$ surface were prepared by placing the wafer in refluxing solutions of 1-alkene or 1-alkyne (0.4 M) in mesitylene,[8] or in neat 1-alkene at 165° C.[15]

1-Hexadecene (Aldrich, purity >99%) was purified by double vacuum distillation to achieve a purity of almost 1000% (GC). All the solvents (Acros) were first distilled at atmospheric pressure before use.

Silicon nitride coated silicon [10×10×0.5 mm$^3$ single side-polished] wafers were supplied by Aquamarijn, The Netherlands, or by Lionix, The Netherlands. Nitride thicknesses between 100 and 200 nm were used in this work.

Silicon nitride samples were first cleaned by rinsing several times with chemically pure acetone and wiped with a tissue. Subsequently, the wafer is sonicated for 5 minutes in acetone. Surfaces were further cleaned in air plasma cleaner/sterilizer (Harrick PDC-32G) for 3 min followed by 2×3 minutes in oxygen plasma. Hydrogen termination is carried out by dipping the samples in 2.5% HF for 2 minutes, while the flask with the HF solution and sample is placed within an ultrasonic bath.

Neat 1-Hexadecene or its solution in mesitylene (10 ml, 0.4 M) is placed in a small, three-necked flask fitted with a nitrogen inlet, a condenser with a $CaCl_2$ tube, and a stopper. The solution is then deoxygenated for at least 45 min, by refluxing it at 200° C., while slowly bubbling dry nitrogen through the solution. Subsequently a freshly hydrogen-terminated silicon nitride wafer is dropped into the refluxing solution by removing and replacing the stopper quickly. The reaction time varied from 2-24 h. Finally, the solution was allowed to cool and the sample was removed and rinsed extensively with distilled PE 40/60, EtOH, and $CH_2Cl_2$.

Example 2

For XPS and water contact angle measurements samples of 10×10 mm$^2$ were used, for IRRAS samples of 30×15 mm$^2$. Silicon nitride surfaces were characterized by static water contact angle measurements using an Erma Contact Angle Meter G-1 (volume of the drop of demineralized $H_2O$=3.5 μl), and by X-ray photoelectron spectroscopy (XPS) on a PHI Quantera SXM machine, with as X-ray source the A1k-α 1486.6 eV line at 24.8 W, with a beam diameter of 100.0 μm, a 1.4 V 15.0 μA neutralizer, and the FAT analyzer mode. The binding energies were calibrated with respect to Si 2p corresponding to $Si_3N_4$ (101.80 eV). The total surface XPS spectrum of the original, un-etched but solvent-cleaned silicon nitride is shown in FIG. 5.

IRRAS spectra were measured on a Bruker Tensor 27 FT-IR spectrometer, using a commercial variable-angle reflection unit (Auto Seagull, Harrick Scientific). A Harrick grid polarizer was installed in front of the detector, and was used for measuring spectra with either p-polarized (parallel) or s-polarized (perpendicular) radiation with respect to the plane of incidence at the sample surface. Single channel transmittance spectra were collected using a spectral resolution of 1 or 4 cm$^{-1}$, using 4096 scans in each measurement. The spectra shown in this paper are the result of spectral subtraction of a solvent-cleaned silicon nitride sample that was used as a background and the spectrum of the modified samples, without any further data manipulation (no line smoothening or so). Samples were first cleaned by rinsing and sonication in acetone (p.a.). The wafers were further cleaned for 2×3 min in an oxygen plasma using a plasma cleaner/sterilizer (Harrick PDC-32G), and used directly afterwards for the attachment of the monolayer. The wafer is placed in hot, nearly refluxing mesitylene (~9 ml), and should be fully covered by the solution. As soon as the wafer is placed into the mesitylene solution, the solution is brought to reflux within ~30 s. After monolayer preparation the modified wafers are cleaned with petroleum ether (40-60), ethanol, and dichloromethane (10× times each). All solvents were distilled before use; all 1-alkenes and 1-alkynes were doubly distilled under vacuum before use. The resulting wafers are stable under ambient conditions, i.e. no change in static water contact angle was measured for a 1-hexadecene-derived monolayer over storage for 1 month.

Example 3

Silicon nitride samples with 1-hexadecyl monolayers prepared according to Example 1 were examined by X-ray reflectivity measurements. Fit of the X-ray reflectivity data of the modified surface indicates a monolayer thickness of 18 Angstrom.

Example 4

Stability of Organic Monolayers in Acid and Alkaline Solutions

A) In Acidic Solutions

Silicon nitride samples with 1-hexadecyl monolayers prepared according to Example 1 were dipped in hydrochloric acid solutions, pH=1, for different time intervals. The static water contact angle is not affected (for more than 1°, the experimental error) up to 4 hours in both cold and hot acid solutions. Slight decreases in the measured contact angles are observed thereafter: The decrease in the water contact angle after 20 hours was only 5° (103°, rather than 108°)

B) In Alkaline Solutions at pH=13

Silicon nitride samples with 1-hexadecyl monolayers prepared according to Example 1 were immersed in 0.1 M aqueous sodium hydroxide solutions for different time intervals. The monolayer stability was monitored by measuring the static water contact angle and recording IRRAS spectra of the monolayer. No significant change in the water contact angle or the quality of the IRRAS spectra was observed up to three hours of treatment. Thereafter, contact angle decreased to 90° after treating the monolayer for four hours.

C) In Alkaline Solution at pH=11 (Alkyl Vs Alkenyl Monolayers)

1-octadecyl and 1-hexadecenyl-modified silicon nitride surfaces prepared according to the method described in Example 2 were dipped in alkaline solution, pH=11, at 60° C. for different time intervals. Monolayer stability was monitored by measuring static water contact angle, and further examination on the stability of the monolayer was performed by recording the IRRAS spectra of the treated samples.

The values of water contact angles of 1-octadecyl monolayer attached to silicon nitride decreased from 108 to 104° after 6 hours under these conditions. However, 1-hexadecenyl monolayers showed a much higher stability, as the water contact angle only decreased from 108 to 102° after 22 hours under the same conditions.

Example 5

Modification of Silicon Carbide

Silicon carbide powder (1 g; 400 mesh from Aldrich) was first cleaned by rinsing several times with chemically pure acetone. Subsequently, the powder is sonicated for 5 minutes in acetone. The dry powder is then cleaned in an oxygen plasma for 10 minutes to achieve complete removal of any organic impurities. Hydrogen termination is obtained by dipping the samples in 2.5% HF for 5 minutes. The powder is then filtered through a Millipore filter, and dried by flushing with $N_2$. Subsequently, the powder is transferred to a deoxygenated refluxing (200° C.) solution of 1-hexadecene in mesitylene in the previously described flask, while slowly bubbling dry nitrogen through the solution. The reaction time was set to 15 h. Afterwards, the solution was allowed to cool and the sample was removed by filtration on a filter paper and rinsed extensively with distilled PE 40/60, EtOH, and $CH_2Cl_2$.

IRRAS Measurements

First, an IRRAS spectrum was recorded for the cleaned SiC powder as a background followed by measuring the spectrum of the modified powder. The subtraction of these spectra provides a spectrum displayer material deposited on top of the SiC.

The antisymmetric and symmetric $CH_2$-stretching bands of the subtracted spectra are shown in FIG. 6. They indicate the presence of a substantial amount of $CH_2$ moieties, corresponding to covalent monolayer formation.

Example 6

Description of measurements of water contact angle θ(results).

TABLE 1

Water Contact angle θ of different monolayers.

| Example No. | Compound (concentration) | θ ± 1° |
|---|---|---|
| 4a | $CH_2=CH-C_{20}H_{41}$ (0.4M) | 106 |
| 4b | $CH_2=CH-C_{16}H_{33}$ (Neat) | 108 |
| 4c | $CH_2=CH-C_{16}H_{33}$ (0.4M) | 108 |
| 4d | $CH_2=CH-C_{14}H_{29}$ (Neat) | 108 |
| 4e | $CH_2=CH-C_{14}H_{29}$ (0.4M) | 107 |
| 4f | $CH_2=CH-C_{12}H_{25}$ (0.4M) | 107 |
| 4g | $CH_2=CH-C_{10}H_{21}$ (0.4M) | 106 |
| 4h | $CH≡C-C_{16}H_{33}$ (0.4M) | 106 |
| 4i | $CH≡C-C_{14}H_{33}$ (0.4M) | 108 |
| 4j | $CH_2=CH-(CH_2)_9COOCH_2CF_3$ (0.4M) | 85 |

These values for the water contact angle θ are an improvement over the result disclosed in U.S. Pat. No. 6,569,979 (78.1°).

Example 7

Attachment of 5

Trifluoroethanol Esters

Monolayers of trifluoroethanol ester were prepared using 0.4 M ester solutions applying the same procedure described previously. Silicon nitride modified with trifluoroethanol ester is hydrolyzed by treatment with either 0.25 M potassium tert-butoxide in DMSO for 3 minutes at room temperature or aqueous 2.5 M HCl at 70° C. for 2 h.

BIBLIOGRAPHY 1. (a) Gmelin Handbook of Inorganic and Organometallic Chemistry: *Silicon Supplement, Silicon Nitride*. Schröder, F. A., Ed. 8th ed.; Springer Verlag: Berlin, 1995; 'Vol.' B 5d1, p 27; (b) Kirk-Othmer, Encyclopedia of Chemical Technology, John Wiley, 1991, Vol. 5, p. 599.
2. van Rijn, C. J. M., *Nano and Micro Engineered Membrane Technology*. Aquamarijn Research BV, The Netherlands: 2002; p 140.
3. (a) Sieval, A. B.; Linke, R.; Zuilhof, H.; Sudhöter, E. J. R. *Adv. Mat.* 2000, 12, 1457. (b) Wayner, D. D. M.; Wolkow, R. A. *J. Chem. Soc., Perkin Trans.* 2 2002, 23. (c) Buriak, J. M. *Chem. Rev.* 2002, 102, 1271.
4. Linford, M. R.; Fenter, P.; Eisenberger, P. M.; Chidsey, C. E. D. *J. Am. Chem. Soc.* 1995, 117, 3145. (b) Sieval, A. B.; Demirel, A. L.; Nissink, J. W. N.; Linford, M. R.; van der Maas, J. H.; de Jeu, W. H.; Zuilhof, H.; Sudhölter, E. J. R. *Langmuir* 1998, 14, 1759.
5. Sun, Q.-Y.; de Smet, L. C. P. M.; van Lagen, B.; Wright, A.; Zuilhof, H.; Sudhölter, E. J. R. *Angew. Chem. Int. Ed.* 2004, 43, 1352.
6. Niederhauser, T. L.; Lua, Y.-Y.; Jiang, G.; Davis, S. D.; Matheson, R.; Hess, D. A.; Mowat, I. A.; Linford, M. R. *Angew. Chem. Int. Ed.* 2002, 41, 2353.
7. Pike, A. R.; Lie, L. H.; Eagling, R. A.; Ryder, L. C.; Patole, S. N.; Connolly, B. A.; Horrocks, B. R.; Houlton, A. *Angew. Chem. Int. Ed.* 2002, 41, 615.
8. de Smet, L. C. P. M.; Stork, G. A.; Hurenkamp, G. H. F.; Sun, Q.-Y.; Topal, H.; Vronen, P. J. E.; Sieval, A. B.;

Wright, A.; Visser, G. M.; Zuilhof, H.; Sudhölter, E. J. R. *J. Am. Chem. Soc.* 2003, 125, 13916.
9. (a) Kölbel, M.; Tjerkstra, R. W.; Kim, G.; Brugger, J.; van Rijn, C. J. M.; Nijdam, W.; Huskens, J.; Reinhoudt, D. N. *Adv. Funct. Mater.* 2003, 13, 219. (b) Ren, S.; Yang, S.; Zhao, Y. *Langmuir* 2003, 19, 2763. (b) Tsukruk, V. V.; Bliznyuk, V. N. *Langmuir* 1998, 14, 446. (c) Qian, L. M.; Xiao, X. D.; Wen, S. Z. *Langmuir* 2000, 16, 662.
10. Gao, H.; Luginbuhl, R.; Sigrist, H. *Sensors Actuators B* 1997, 38, 38.
11. Pignataro, B.; Grasso, G.; Renna, L.; Marietta, G. *Surf. Interf. Anal.* 2002, 33, 54.
12. Cricenti, A.; Longo, G.; Luce, M.; Generosi, R.; Perfetti, P.; Vobornik, D.; Margaritondo, G.; Thielen, P.; Sanghera, J. S.; Aggarwal, I. D.; Miller, J. K.; Tolk, N. H.; Piston, D. W.; Cattaruzza, F.; Flamini, A.; Prosperi, T.; Mezzi, A. *Surf Sci.* 2003, 544, 51.
13. Sieval, A. B.; Vleeming, V.; Zuilhof, H.; Sudhölter, E. J. R. *Langmuir* 1999, 15, 8288.
14. Moulder, J. F.; Stickle, W. F.; Sobol, P. E.; Bomben, K. D., *Handbook of X Ray Photoelectron Spectroscopy*. Physical Electronics USA: 1995, p. 40.
15. (a) McOmie, J. F. W., *Protective Groups in Organic Chemistry*, Plenum Press, 1973; (b) Theodora W. Greene, Peter G. M. Wuts, *Protective Groups in Organic Synthesis*, 3$^{rd}$ Edition, John Wiley & Sons Inc, June 1999 (c) Carey, F. A.; Sundberg, R. J., *Advanced Organic Chemistry Part B: Reactions and Synthesis*, 3$^{rd}$. Ed., Plenum Press, p. 678-686, 1990.
16. Lalonde, *Synthesis* 9, 817-908, 1985.

The invention claimed is:
1. A functionalized Si/Ge surface, the Si/Ge surface being selected from the group consisting of silicon nitride, silicon carbide, germanium nitride, germanium carbide and silicon germanium surfaces, wherein the Si/Ge surface is covalently bonded to moieties being represented by the general formula (1):

wherein A is a linear, branched or cyclic alkylene or alkenylene group having 2 to 24 carbon atoms, the alkenylene group being a 1-alkenylene or an internal alkenylene group;
B is a functional group selected from:
—CH=CR$^2$R$^3$,
—C≡C$^2$,
—XR$^2$,
—N(R$^2$)$_2$,
—NR$^2$—C(O)—N(R$^2$)$_2$,
—O—[(C(R$^4$)$_2$)$_p$O]$_q$—R$^2$,
—C(X)XR$^1$,
—C(X)NR$^2$R$^3$,
—S(O)OR$^1$,
—S(O)$_2$OR$^1$,
—S(O)NR$^2$R$^3$,
—S(O)$_2$NR$^2$R$^3$,
—P(O)(R$^1$)(OR$^1$),
—P(O)(OR$^1$)$_2$,
—CN,
—Cl,
—Br,
—I,
—NCX,
—XCN,
a group of the general formula (2) and tautomers thereof:

or a group of the general formula (3) and tautomers thereof:

wherein R$^1$ is a linear, branched or cyclic alkyl group having 1 to 12 carbon atoms a phenyl group, an alkaryl group having 7 to 12 carbon atoms, or an arylalkyl group having 7 to 12 carbon atoms, wherein the alkyl, phenyl, alkaryl and arylalkyl groups may be substituted with one or more of F or Cl;
R$^2$ and R$^3$ are independently hydrogen or a group as defined for R$^1$;
R$^4$ is independently selected from hydrogen or C$_1$-C$_4$ alkyl;
R$^5$ is independently selected from hydrogen, —OH and —NH$_2$;
R* is a group as defined for R$^1$ or selected from the group consisting of DNA, ethylene oxide propylene oxide polymers, sugars, peptides and fragments thereof;
p is an integer in the range of 2-4;
q is an integer in the range of 1 to 500;
X is independently O or S;
n is an integer in the range of 1 to 3; and
wherein the Si/Ge surface is functionalized by reacting with ω-functionalized alkene or alkyne.
2. The functionalized Si/Ge surface according to claim 1, wherein the silicon nitrides and germanium nitrides have the formula M$_3$N$_x$, wherein M is Si or Ge and x is in the range of 1 to 4.
3. The functionalized Si/Ge surface according to claim 1, wherein the silicon and germanium carbides have the formula M$_x$C$_y$, wherein M is Si or Ge and x is in the range of 0.3y to 3y.
4. The functionalized Si/Ge surface according to claim 1, wherein B is a functional group selected from:
—CH=CR$^2$R$^3$,
—C≡CR$^2$,
—OR$^2$,
—N(R$^2$)$_2$,
—O—[(C(R$^4$)$_2$)$_p$O]$_q$—R$^2$ wherein R$^4$ is hydrogen or methyl, p is 2 and q is an integer within the range of 1-250,
—C(O)OR$^1$,
—C(O)NR$^2$R$^3$,
—S(O)OR$^1$,
—S(O)$_2$OR$^1$,
—S(O)NR$^2$R$^3$, or —S(O)$_2$NR$^2$R$^3$; and wherein n is 1.

5. The functionalized Si/Ge surface according to claim 1, wherein A is a linear alkylene group having 2 to 24 carbon atoms.

6. The functionalized Si/Ge surface according to claim 1, wherein A is a linear group having 6 to 24 carbon atoms according to the formula:

—CH$_2$—CH$_2$—(CH$_2$)$_p$—(C≡C)$_q$—CH$_2$— wherein p is in the range of 1 to 7 and q is in the range of 1 to 7, the groups —(CH$_2$)— and —(C≡C)— optionally occurring in a random sequence, and wherein the right terminus of A is bonded to B.

7. A Si/Ge surface bearing pendant groups wherein alkyl or alkenyl moieties are covalently bonded to the Si/Ge surface, the alkyl and alkenyl moieties being as defined in claim 1 and the alkyl and alkenyl moieties bearing a pendant group, wherein the pendant group is derived from biologically active groups or host molecules.

8. The Si/Ge surface bearing pendant groups according to claim 7, wherein the biologically active groups are selected from protein, DNA and RNA moieties.

9. The Si/Ge surface bearing pendant groups according to claim 7, wherein the host molecules are calixarenes dendrimers, and mono- oligo- and polysaccharides.

10. A process for the preparation of Si/Ge surface bearing pendant groups comprising attaching a functionalized Si/Ge surface according to claim 1 to a pendant group, wherein the pendant group is derived from biologically active groups or host molecules.

11. A Si/Ge surface bearing pendant groups obtainable by the process according to claim 10.

12. A functionalized Si/Ge surface, the Si/Ge surface being selected from the group consisting of silicon nitride, silicon carbide, germanium nitride, germanium carbide and silicon germanium surfaces, wherein the Si/Ge surface is covalently bonded to moieties being represented by the general formula (1):

—A—[B]$_n$     (1)

wherein A is a linear, branched or cyclic alkylene or alkenylene group having 2 to 24 carbon atoms, the alkenylene group being a 1-alkenylene or an internal alkenylene group;

B is a functional group selected from:
—CH=CR$^2$R$^3$,
—C≡C$^2$,
—XR$^2$,
—N(R$^2$)$_2$,
—NR$^2$—C(O)—N(R$^2$)$_2$,
—O—[(C(R$^4$)$_2$)$_p$O]$_q$—R$^2$,
—C(X)XR$^1$,
—C(X)NR$^2$R$^3$,
—S(O)OR$^1$,
—S(O)$_2$OR$^1$,
—S(O)NR$^2$R$^3$,
—S(O)$_2$NR$^2$R$^3$,
—P(O)(R$^1$)(OR$^1$),
—P(O)(OR$^1$)$_2$,
—CN,
—Cl,
—Br,
—I,
—NCX,
—XCN,
a group of the general formula (2) and tautomers thereof:

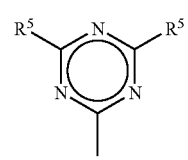

or a group of the general formula (3) and tautomers thereof:

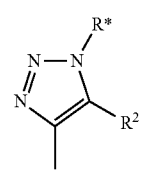

wherein R$^1$ is a linear, branched or cyclic alkyl group having 1 to 12 carbon atoms, a phenyl group, an alkaryl group having 7 to 12 carbon atoms, or an arylalkyl group having 7 to 12 carbon atoms, wherein the alkyl, phenyl, alkaryl and arylalkyl groups may be substituted with one or more of F or Cl;

R$^2$ and R$^3$ are independently hydrogen or a group as defined for R$^1$;

R$^4$ is independently selected from hydrogen or C$_1$-C$_4$ alkyl;

R$^5$ is independently selected from hydrogen, —OH and —NH$_2$;

R* is a group as defined for R$^1$ or selected from the group consisting of DNA, ethylene oxide propylene oxide polymers, sugars, peptides and fragments thereof;

p is an integer in the range of 2-4;

q is an integer in the range of 1 to 500;

X is independently O or S;

n is an integer in the range of 1 to 3; and wherein the silicon germanium surface comprises strained silicon according to the formula Si$_{1-x}$Ge$_x$, wherein x is in the range of 0.05 to 0.95.

13. The functionalized Si/Ge surface according to any one of claims 1-3 and 12, wherein B is a functional group selected from:
—CH=CR$^2$R$^3$,
—C≡C$^2$,
—OR$^2$,
—N(R$^2$)$_2$,
—NR$^2$—C(O)—N(R$^2$)$_2$,
—O—[(C(R$^4$)$_2$)$_p$O]$_q$—R$^2$,
—C(O)OR$^1$,
—C(O)SR$^1$,
—C(O)NR$^2$R$^3$,
—S(O)OR$^1$,
—S(O)$_2$OR$^1$,
—S(O)NR$^2$R$^3$,
—S(O)$_2$NR$^2$R$^3$,
—P(O)(R$^1$)(OR$^1$),
—P(O)(OR$^1$)$_2$,
—CN,
—Cl,

—NCO,
—OCN,

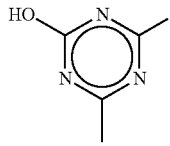 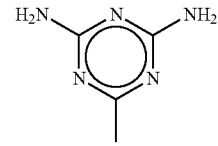

or tautomers thereof,
and wherein n is 1.

14. A process for the preparation of a functionalized Si/Ge surface, the Si/Ge surface being selected from the group consisting of silicon nitride, silicon carbide, germanium nitride, germanium carbide and silicon germanium surfaces, wherein a Si/Ge surface is subjected to the following steps:
(a) etching the Si/Ge surface with an etching agent to form an etched Si/Ge surface; and
(b) reacting the etched Si/Ge surface with an ω-functionalized alkene represented by the general formula (4) or with an ω-functionalized alkyne represented by the general formula (5) or with a mixture thereof:

$$P\!\!-\!\![C]_n \quad (4)$$

$$Q\!\!-\!\![C]_n \quad (5)$$

wherein P is a linear, branched or cyclic alkenyl group having 2 to 24 carbon atoms, the alkenyl group being a 1-alkenyl group or an internal alkenyl group; Q is a linear, branched or cyclic alkynyl group having 2 to 24 carbon atoms, the alkynyl group being a 1-alkynyl group or an internal alkynyl group;
C is a functional group selected from:
—CH═CR²R³,
—C≡CR²,
—NR²—C(O)—N(R²)₂,
—O—[(C(R⁴)₂)ₚO]_q—R¹,
—C(X)XR¹,
—C(X)NR²R³,
—S(O)OR¹,
—S(O)₂OR¹,
—S(O)NR²R³,
—S(O)₂NR²R³,
—P(O)(R¹)(OR¹),
—P(O)(OR¹)₂,
—CN,
—Cl,
—Br,
—I,
—NCX, or
—XCN; or
C is a protected functional group selected from:
—XC(X)R¹,
—NR²C(X)R¹,
—XR⁵,
—XSi(R¹)₃,
—OS(O)(OR¹),
—OS(O)₂OR¹,
—P(O)(R¹)(OR¹); —OP(O)(OR¹)₂, or a group of the general formula (6) and tautomers thereof:

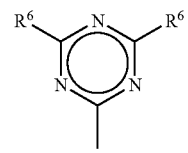

(6)

wherein R¹, R², R³, R⁴, p and q are as defined in claim 1; R⁵ is a monofunctional hydroxy or thiohydroxy protecting group; R⁶ represents a protected —OH or —NH₂ group, wherein the protected —OH group is selected from the groups defined for —XR⁵ wherein X is O and wherein the protected —NH₂ group is selected from the groups defined for —NR²C(X)R¹; and wherein n is an integer in the range of 1 to 3.

15. The process according to claim 14, wherein C is in the ω-position of the alkenyl and alkynyl groups.

16. The process according to claim 14 or claim 15, wherein C is a functional group selected from:
—CH═CR²R³,
—C≡C²,
—NR²—C(O)—N(R²)₂,
—O—[(C(R⁴)₂)ₚO]_q—R¹,
—C(O)OR¹,
—C(O)NR²R³,
—S(O)OR¹,
—S(O)₂OR¹,
—S(O)NR²R³,
—S(O)₂NR²R³,
—P(O)(R¹)(OR¹),
—P(O)(OR¹)₂,
—CN,
—Cl,
—NCO, or
—OCN; or
C is a protected functional group selected from:
—OC(O)R¹,
—NR²C(O)R¹,
—OR⁵,
—OSi(R¹)₃,
—OS(O)(OR¹),
—OS(O)₂OR¹,
—P(O)(R¹)(OR¹),
—OP(O)(OR¹)₂, or
a group of the general formula (6) and tautomers thereof, wherein R⁶ represents a protected —OH or —NH₂ group, wherein the protected —OH group is selected from the groups defined for —XR⁵ wherein X is O and wherein the protected —NH₂ group is selected from the groups defined for —NR²(X)R¹; and wherein n is 1.

17. The process according to claim 14, wherein C is a functional group selected from:
—CH═CR²R³,
—C≡CR²,
—O—[(C(R⁴)₂)ₚO]_q—R², wherein R⁴ is hydrogen or methyl, p is 2 and q is an integer within the range of 1-10,
—C(O)OR¹,
—C(O)NR²R³,
—S(O)OR¹,
—S(O)₂OR¹,
—S(O)NR²R³, or
—S(O)₂NR²R³; or C is a protected functional group selected from:
—OC(O)R$^1$,
—NR$^2$C(O)R$^1$,
—OR$^5$,
—OSi(R$^1$)$_3$, or
a group of the general formula (6) and tautomers thereof, wherein R$^6$ represents a protected —OH or —NH$_2$ group, wherein the protected —OH group is selected from the groups defined for —XR$^5$ wherein X is O and wherein the protected —NH$_2$ group is selected from the groups defined for —NR$^2$C(X)R$^1$; and wherein n is 1.

18. The process according to claim 14, wherein P and Q are a linear group having 6 to 24 carbon atoms according to the formula:

—CH=CH—(CH$_2$)$_p$—(C≡C)$_q$—CH$_2$— and

—C≡C—(CH$_2$)$_p$—(C≡C)$_q$—CH$_2$— wherein p is in the range of 1 to 7 and q is in the range of 1 to 7, the groups —(CH$_2$)— and —(C≡C)— optionally occurring in a random sequence, and wherein the right terminus of P and Q are bonded to C.

19. A functionalized Si/Ge surface obtainable by the process of claim 14.

* * * * *